United States Patent
Schexnaydre et al.

(10) Patent No.: US 10,263,791 B2
(45) Date of Patent: Apr. 16, 2019

(54) ACCELERATION OF ONLINE CERTIFICATE STATUS CHECKING WITH AN INTERNET HINTING SERVICE

(71) Applicant: VIASAT, INC., Carlsbad, CA (US)

(72) Inventors: Michael J Schexnaydre, Lancaster, MA (US); Peter J Lepeska, Boston, MA (US); Douglas C Larrick, Newton, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/927,992

(22) Filed: Mar. 21, 2018

(65) Prior Publication Data

US 2018/0248705 A1 Aug. 30, 2018

Related U.S. Application Data

(63) Continuation of application No. PCT/US2016/053498, filed on Sep. 23, 2016.

(60) Provisional application No. 62/222,460, filed on Sep. 23, 2015.

(51) Int. Cl.
*H04L 9/32* (2006.01)
*H04L 29/06* (2006.01)
*H04L 29/08* (2006.01)

(52) U.S. Cl.
CPC ........ *H04L 9/3268* (2013.01); *H04L 63/0823* (2013.01); *H04L 67/2842* (2013.01); *H04L 67/02* (2013.01)

(58) Field of Classification Search
CPC .. H04L 9/3263–9/3268; H04L 41/0869; H04L 63/0823; H04L 67/2842–67/2857
See application file for complete search history.

(56) References Cited

U.S. PATENT DOCUMENTS

| | | | |
|---|---|---|---|
| 6,085,193 A | 7/2000 | Malkin et al. | |
| 8,230,214 B2 | 7/2012 | Kanekar et al. | |
| 8,335,838 B2 | 12/2012 | Zhang et al. | |
| 8,341,245 B1 | 12/2012 | Roskind et al. | |
| 8,478,843 B1 | 7/2013 | Ortlieb et al. | |
| 9,083,583 B1 | 7/2015 | Roskind et al. | |
| 9,135,364 B1 | 9/2015 | Sundaram et al. | |

(Continued)

FOREIGN PATENT DOCUMENTS

WO WO-2017/053835 A1 3/2017

OTHER PUBLICATIONS

Bouius, "Accelerating Cryptographic Operations in the TLS Protocol", https://www.synopsys.com/designware-ip/technical-bulletin/accelerating-cryptographic-operations.html, retrieved May 6, 2016, 4 pgs.

(Continued)

*Primary Examiner* — Kevin Bechtel
(74) *Attorney, Agent, or Firm* — Kilpatrick Townsend & Stockton LLP

(57) ABSTRACT

Examples for acceleration of online certificate status checking with an Internet hinting service are disclosed. For example, one method includes receiving, by a computing device from a hinting server, hint information comprising certificate information; receiving, from a remote computing device, a certificate in response to a request to establish secure communications with the remote computing device; and determining a validity of the certificate based on the certificate information.

28 Claims, 9 Drawing Sheets

(56) References Cited

U.S. PATENT DOCUMENTS

| | | | |
|---|---|---|---|
| 2002/0010761 A1 | 1/2002 | Carneal et al. | |
| 2005/0278534 A1* | 12/2005 | Nadalin | H04L 9/3263 713/175 |
| 2008/0114773 A1 | 5/2008 | Choi et al. | |
| 2009/0100228 A1* | 4/2009 | Lepeska | G06F 17/30902 711/125 |
| 2011/0113244 A1 | 5/2011 | Chou et al. | |
| 2011/0154026 A1 | 6/2011 | Edstrom et al. | |
| 2012/0265991 A1 | 10/2012 | Kanekar et al. | |
| 2013/0297561 A1 | 11/2013 | Mizrotsky et al. | |
| 2014/0325232 A1* | 10/2014 | Schultz | H04L 63/0823 713/175 |
| 2015/0156194 A1 | 6/2015 | Modi et al. | |
| 2015/0350370 A1 | 12/2015 | Lepeska et al. | |

OTHER PUBLICATIONS

Cisco, "Cisco Wide Area Application Services SSL Acceleration Technical Overview", http://www.cisco.com/go/waas, 2010, 9 pgs.
Couprie, "5 easy tips to accelerate SSL", https://unhandledexpression.com/2013/01/25/5-easy-tips-to-accelerate-ssl/, retrieved May 6, 2016, 17 pgs.
Imperva Incapsula, "CDN and SSUTLS", The Essential CDN Guide, Chapter 5, https://www.incapsula.com/cdn-guide/cdn-and-ssl-tls.html, retrieved May 6, 2016, 8 pgs.
Stark et al., "The Case for Prefetching and Prevalidating TLS Server Certificates", NDSS, Feb. 8, 2012, 12 pgs.
International Search Report and Written Opinion mailed in International (PCT) Application No. PCT/US2016/053498 dated Jan. 19, 2017, 17 pgs.

* cited by examiner

US 10,263,791 B2

ACCELERATION OF ONLINE CERTIFICATE STATUS CHECKING WITH AN INTERNET HINTING SERVICE

CROSS-REFERENCE TO RELATED APPLICATIONS

This is a continuation of and claims priority to international patent application PCT/US2016/053498 (filed Sep. 23, 2016 and published as WO 2017/053835), which claims priority to U.S. provisional patent application No. 62/222,460 (filed Sep. 23, 2015). The foregoing international application and US provisional application are hereby incorporated in their entireties by reference.

FIELD

The present application generally relates to certificates for secure communications and more specifically relates to acceleration of online certificate status checking with an Internet hinting service.

BACKGROUND

Web browsers allow users to communicate with content servers using encrypted communications. The encrypted communications are established between a web browser and a content server based on mutually agreed-upon keys after the content server has authenticated its identity to the web browser. Authentication of the content server may be accomplished using certificates issued by a known certificate authority. The web browser may then verify the authenticity of the certificate by contacting the issuing certificate authority before establishing a secure communications channel with the content server.

SUMMARY

Various examples are described for acceleration of online certificate status checking with an Internet hinting service. One example method includes receiving, by a computing device from a hinting server, hint information comprising certificate information; receiving, from a remote computing device, a certificate in response to a request to establish secure communications with the remote computing device; and determining a validity of the certificate based on the certificate information.

Another example method includes receiving hinting feedback from a first computing device, the hinting feedback comprising certificate information about one or more certificates; and responsive to determining that the certificate information comprises new certificate information, storing the new certificate information in a cache, the one or more certificates related to a web transaction between the first computing device and a remote computing device, wherein the web transaction included establishing a secure communications channel.

One example device includes a memory; and a processor configured to execute processor-executable program code stored in memory, the processor-executable program code configured to cause the processor to: receive, from a hinting server, hint information comprising certificate information; receive, from a remote computing device, a certificate in response to a request to establish secure communications with the remote computing device; and determine a validity of the certificate based on the certificate information.

Another example device includes a memory; and a processor configured to execute processor-executable program code stored in memory, the processor-executable program code configured to cause the processor to: receive hinting feedback from a first computing device, the hinting feedback comprising certificate information about one or more certificates; and responsive to a determination that the certificate information comprises new certificate information, store the new certificate information in a cache, the one or more certificates related to a web transaction between the first computing device and a remote computing device, wherein the web transaction included establishing a secure communications channel.

One example computer-readable medium includes processor-executable program code configured to cause a processor to: receive, from a hinting server, hint information comprising certificate information; receive, from a remote computing device, a certificate in response to a request to establish secure communications with the remote computing device; and determine a validity of the certificate based on the certificate information.

Another example computer-readable medium includes processor-executable program code configured to cause a processor to: receive hinting feedback from a first computing device, the hinting feedback comprising certificate information about one or more certificates; and responsive to a determination that the certificate information comprises new certificate information, store the new certificate information in a cache, the one or more certificates related to a web transaction between the first computing device and a remote computing device, wherein the web transaction included establishing a secure communications channel.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
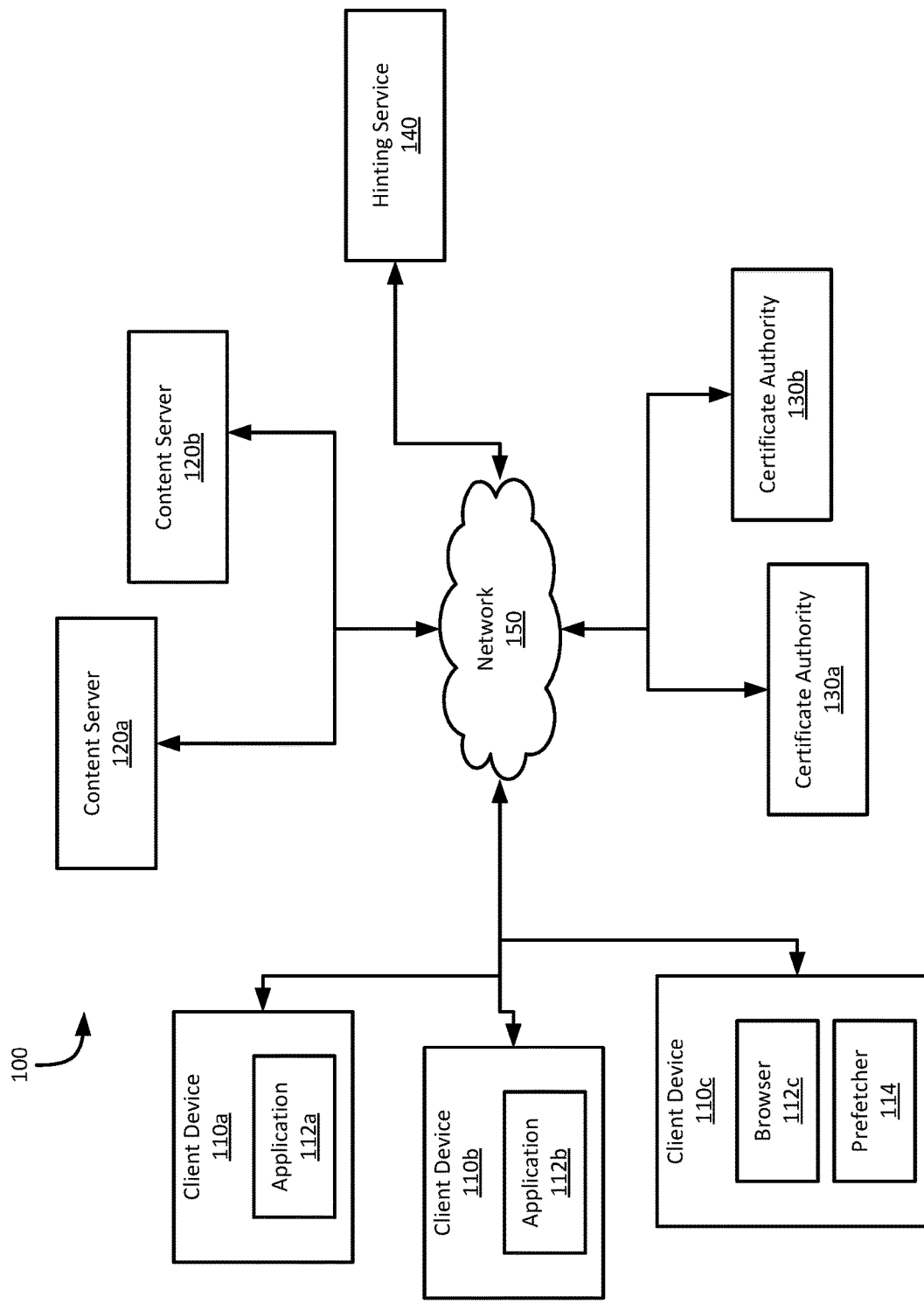
FIGS. 1-2 show example systems for acceleration of online certificate status checking with an Internet hinting service.

Examples are described herein in the context of acceleration of online certificate status checking with an Internet hinting service. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In one illustrative example of acceleration of online certificate status checking with an Internet hinting service, a user launches a web browser on their home computer and navigates to a universal resource locator ("URL") to access their bank account to pay bills. When the user selects the URL, the web browser issues a request to the bank's web server to establish a communication channel. The bank's web server responds and the two computers establish an unsecured communications channel. The user's computer then issues a request for a secure communications channel. The bank's web server receives the request and responds, in part, by sending a certificate purporting to authenticate the bank's web server. Such certificates are typically created and issued by a known certificate authority to a specific computing device, such as a server, or to a web site, and can be used to verify the identity of the computing device that provided the certificate. The authenticity of the certificate can later be verified by requesting information from the issuing certificate authority and comparing the received certificate information with the certificate.

In this illustrative example, however, the web browser issued a request to an Internet hinting service when the user entered the bank's URL. In response to the request, the Internet hinting service sent hint information to the web browser for the URL. Such hint information may include information to assist in prefetching objects used in one or more web pages served by the bank's web server. In this example, the hint information includes certificate information about the bank's web server's certificate. Thus, when the bank's web server provides its certificate to the web browser, the web browser can validate the certificate using the hint information rather than issuing a request to the certificate authority. If the web browser determines that the certificate is valid, it accepts the certificate and then establishes a secure communication channel with the bank's web server. If the certificate is not valid, the web browser disconnects from the bank's web server. However, if the certificate information included in the hint information does not include information about the received certificate or is too old, e.g., the certificate information indicates an expiration time of the certificate information has passed, the web browser may then send a request to the certificate authority to request validation of the certificate.

After establishing the secure connection with the bank's web server, the bank's web server transmits a web page to the web browser to display to the user. The user then uses the web page to pay her bills, and then navigates away from the bank's web page. Once the bank's web page has been loaded (e.g., fully loaded), the web browser generates feedback information based on the web page transaction, including information about the certificate. The web browser then transmits the feedback information to the Internet hinting service, which uses the feedback information to update its own cache of information about the bank's web server and its certificate.

By obtaining certificate information via a hinting service, the user's web browser may accelerate the process of establishing a secure communications channel. A secure communications channel may employ an encrypted communications protocol, such as secure HTTP ("HTTPS"), or any other suitable secure communications protocol. To establish a secure communications channel, the ordinary process may be to receive the certificate from the bank's web server and then request information from a certificate authority. But instead, because the certificate information was received with hint information that was requested when the user selected the URL (or may even be requested before the user selects a URL), the certificate can be validated more quickly. Such improvements may be particularly helpful in the context of communications over a high-latency or low-bandwidth communications link, e.g., a satellite link. Communications with a certificate authority can take hundreds of milliseconds to seconds. Thus, eliminating the need to contact a certificate authority can reduce the time to establish a secure communication channel with a server.

This illustrative example is given to introduce the reader to the general subject matter discussed herein and the disclosure is not limited to this example. The following sections describe various additional non-limiting examples of systems and methods for acceleration of online certificate status checking with an Internet hinting service.

Referring now to FIG. 1, FIG. 1 shows an example system 100 for accelerating online certificate status checking with an Internet hinting service. This example system 100 includes multiple client devices 110a-c, multiple content servers 120a-b, multiple certificate authorities 130a-b, and a hinting service 140, each of which includes one or more computing devices, which are described in more detail with respect to FIG. 3. In addition, each of these components is in communication with the others via one or more communication networks represented by network 150, which is described in more detail below. The client devices 110a-c each are executing Internet-enabled applications 112a-c (or, simply, applications), which may include applications such as web browsers (such as web browser 112c, which also communicates with a prefetcher 114) or mobile apps.

The applications 112a-c, during operation, communicate with one or more content servers 120a-b to obtain information, such as information to present a user using the respective application 112a-c, e.g., a web browser, a mobile app, a streaming video player, an email application, a word processing application, database software, etc. The content servers 120a-b may provide any kind of information requested by the applications 112a-c, and may include information such as news, financial information, retail shopping information, or medical records. Because some of this information may be sensitive or confidential and protected from access by one or more login or authentication requirements, the content servers 120a-b may require the user to supply login and password information before providing access to the requested information. However, to ensure security of the login and password information, as well as of the requested information, the applications 112a-c may first request a secured communications channel with the content server 120a-b.

To communicate with a content server, e.g., content server 120a, in this example a client device 110a transmits an initial request to the content server 120a requesting an initial, unsecured connection. The content server 120a responds to the request with certain information about the initial connection and the client device acknowledges the content server's response, which establishes the initial connection. Such initial connections may be created using any suitable communications protocol, such as the hypertext transfer protocol ("HTTP"), a file transfer protocol ("FTP"), a simple mail transfer protocol ("SMTP"), etc. that may be communicated over lower-layer protocols such as the Transmission Control Protocol ("TCP") and the Internet Protocol ("IP") (collectively referred to as "TCP/IP"). It should be appreciated that the specific negotiation procedure will vary based on the protocols involved in establishing an initial unsecured communications connection. Further, some protocols may not create an unsecured communications connection prior to establishing a secured communications connection. Instead, they may immediately request a secure communications connection. Examples according to this disclosure may be usable with any such protocols.

After the initial connection is established, the client device 110*a* then transmits a request to establish a secure communications channel to the content server 120*a*. After receiving the client device's request, the content server 120*a* responds to the request with information for establishing a secure communications channel as well as a certificate to authenticate the content server 120*a* to the client device 110*a*.

A certificate is provided by the content server 120*a* to authenticate to the client device 110*a* that the content server 120*a* is controlled by the entity the client device 110*a* "believes" it is controlled by. For example, if the client device 110*a* initially sends a communications request to a content server at "www.bank.com," it may receive a response and establish a connection with the server that responded, but the client device 110*a* has no assurance that the responding server is actually a www.bank.com server or if the connection has been compromised and re-routed to a server operated by another unknown entity. In such a situation, if the client device 110*a* were to provide sensitive information to the unknown entity, e.g., login and password information or credit card information, the unknown entity may be able to then make unauthorized use of such information.

The certificate in this case is provided by the content server 120*a* and includes information identifying the content server 120*a*, the entity that controls the server, e.g., a financial institution, and the entity that issued the certificate, such as one of the certificate authorities 130*a-b*, and may include other information, such as an identification number, encryption keys or algorithms, supported secure communications protocols, expiration information, etc. In some examples, a certificate may be an X.509-compliant certificate.

The certificate authorities 130*a-b* are well-known entities that function to provide such certificates. Entities, such as the financial institution that operates content server 120*a*, may purchase certificates from a certificate authority, such as certificate authority 130*a*. The certificate authority 130*a* then generates a certificate for the content server 120*a*, which may be used for a predefined period of time. After the predefined period of time expires, the certificate is invalidated, and a new certificate is issued. Certificates may also be revoked for other reasons, e.g., the certificate is compromised by a third party. The certificate authority 130*a* maintains a record of previously issued, but now revoked, certificates such that a client 110*a* can determine whether a certificate presented by a content server 120*a* is valid or has been revoked.

Thus, after receiving the certificate from the content server 120*a*, the client device 110*a* verifies that the certificate is valid before accepting the certificate and establishing a secure communications connection with the content server 120*a*. Typically, the client device 110*a* would first check certain information within the certificate to verify the apparent authenticity of the certificate, such as a digital signature or an expiration date. If these checks fail, the client device 110*a* may reject the certificate and may terminate the connection with the content server 120*a*. If these checks succeed, the client device 110*a* may then transmit a request to the certificate authority identified in the certificate, certificate authority 130*a* in this example, for certificate information, e.g., a certificate revocation list ("CRL"). CRLs are typically associated with a particular certificate authority 130*a* rather than a particular server or servers, thus, the certificate authority 130*a* would respond with a CRL for the certificate authority 130*a*, and the client device 110*a* would determine whether the certificate has been revoked by searching the CRL for the certificate it received from the content server 120*a*. If the certificate has been revoked, the client device 110*a* typically terminates the connection. If the certificate remains valid, however, the client device 110*a* accepts the certificate and establishes a secure communications channel with the content server 120*a*.

In this example, however, after the client device 110*a* launched the application 112*a*, the application 112*a* sent a request to the hinting service 140 for hint information for the content server 120*a*. In examples where the application 112*a* is a web browser, a prefetcher (e.g., prefetcher 114) may issue such a request when it detects the web browser has started a web page transaction with the content server 120*a* (or if it anticipates that such a web page transaction is likely to occur). For other types of applications, such as dedicated banking or shopping applications, the application 112*a* may issue one or more requests to a hinting service 140 when the application 112*a* is launched.

As noted below, an express or even implicit request from the application 112*a* is but one example of a trigger that can cause the hinting server 140 to send hinting information to the application 112*a*. Examples of other triggers include knowledge at the hinting server 140 of the browsing history or browsing habits of the application 112*a*, which can in some examples, be periodically provided by the application 112*a* to an external network such as a cloud from which the hinting server 140 can receive such information. The hinting server 140 can be configured to utilize the browsing history or habits of the application 112*a* to anticipate and thus push hinting information to the application 112*a* without first receiving a request from the application 112*a*. Another example of a trigger is the return of requested search results to the application 112*a*. The hinting server 140 can be configured to, upon receiving a copy or other information regarding the search results, push hinting information for one or more of the URLs in the search results. Yet another example of a trigger is the application 112*a* transitioning from one particular state to another. For example, the hinting server 140 can be configured to know that the application 112*a* typically requests a particular URL or set of URLs each time the application 112*a*, which in this example, can be a browser, is opened. The hinting server 140 can be configured to, upon detecting or otherwise being notified that the application 112*a* has been opened, push hinting information for those URLs to the application 112*a*.

Nevertheless, requests to the hinting service 140 typically request information for an identified URL, e.g., the link entered or clicked by a user or one or more URLs obtained by the application 112*a* from memory or another source. The hinting service 140 responds with hint information, which may include information to assist a prefetcher, but in this example includes certificate information. In this example, the hint information includes one or more CRLs associated with the certificate authority 130*a*. It should be appreciated that while a client device 110a may initially communicate with one content server operated by an entity, during the course of a web page or other transaction, the client device 110a may communicate with a large number of different content servers operated by the entity, each of which may provide different information as a part of the transaction. Thus, in some examples, the client device 110a may search the CRL for multiple certificates. In some examples, a web page served by a content server 120a may involve obtaining information from other entities having one or more certificates issued by the same or a different certificate authority, e.g., certificate authority 130b. Thus, the client device 110a may also obtain a CRL associated with each other certificate authority associated with any received certificates.

Thus, after receiving the hint information, the client device 110a may be able to authenticate the certificate received from the content server 120a by using the received CRL from the hinting service 140. To do so, the client device 110a first determines the age of the CRL by examining information included in the certificate information, such as the last time the hinting service 140 updated its CRL information. If the last update time is sufficiently recent, e.g., is less than 10 minutes old, the client device 110a accepts the CRL and stores it in cache for later use to authenticate any certificates received from the content server 120. However, if the CRL is too old, the client device rejects the CRL and will transmit a request to the appropriate certificate authority(ies) 130a-b upon receipt of a certificate or certificates from the content server 120a.

After verifying the authenticity of the certificate(s) received from the content server 120a, the client device 110a responds to the content server 120a and the secure connection is established.

In this example, the client devices 110a-c, content servers 120a-c, certificate authorities 130a-c, and hinting service 140 include one or more suitable computing devices. An example of a suitable computing device is described in more detail below with respect to FIG. 3.

The network 150 depicted in FIG. 1 includes the Internet, but may also include one or more other local area or wide area networks. Such networks may include wired or wireless communication links, including Ethernet, WiFi, cellular, or satellite communication links, and may employ any suitable networking protocols, including TCP/IP, User Datagram Protocol over IP ("UDP/IP"), HTTP, HTTPS, TLS, FTP, FTPS, etc.

Figure 2:
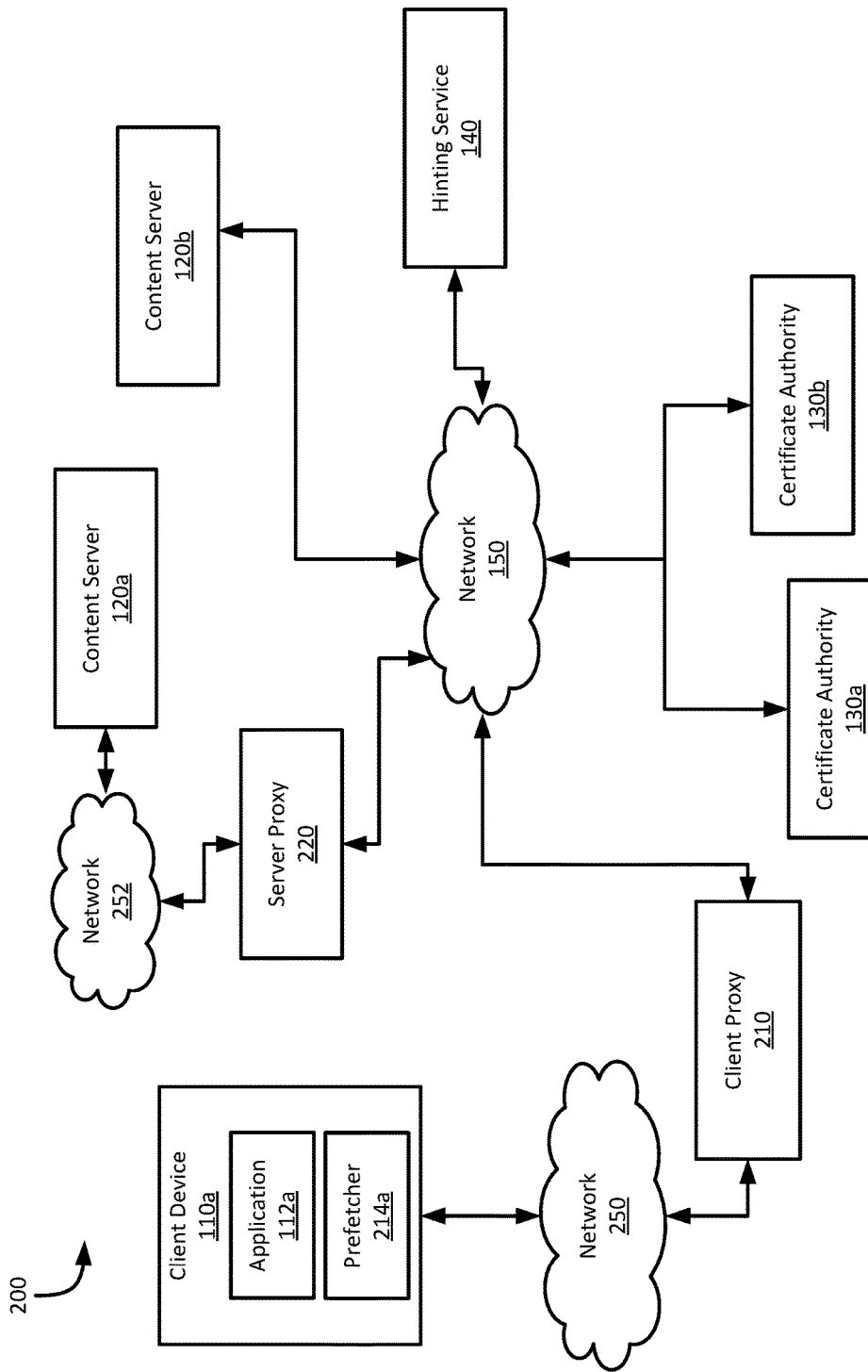

Referring now to FIG. 2, FIG. 2 shows another example system 200 for accelerating online certificate status checking with an Internet hinting service. In this example, the system 200 is similar to the system 100 of FIG. 1; however, it also includes a client proxy 210 in communication with the client device 110a via network 250, and a server proxy 220 in communication with content server 120a via network 252. In this example, however, rather than the client device 110a issuing a request to the hinting service 140, either the client proxy 210 or server proxy 220 (or both) may issue requests for hint information to the hinting service 140. The hint information may enable the respective proxy to obtain certificate information that may be provided to the client device 110a in response to a later request from the client device 110a for certificate information from a certificate authority 130a-b.

For example, the client proxy 210 may detect a new network transaction request sent by the client device 110a to the content server 120a. The client proxy 210 may then generate and transmit a request to the hinting service 140 for hint information associated with the content server 120a. The hinting service 140 may then respond to the client proxy with hint information that includes certificate information. The client proxy 210 may then cache the hint information, including the certificate information. At a later time, the client device 110a may receive a certificate from the content server 120a and transmit a request to the certificate authority 130a for certificate information associated with the content server 120a. The client proxy 210 intercepts the request from the client device 110a and checks its cache for relevant certificate information. It may then respond to the request from the client 110a with the certificate information from its cache without transmitting the request to the certificate authority 130a. The client device 110a may then use the certificate information to validate the certificate and establish a secure communications channel with the content server 120a. It should be appreciated that, while in this example, the client proxy 210 intercepted and provided the certificate information to the client device 110a, in some examples the server proxy 220 may request and provide the certificate information to the client device 110a rather than client proxy 210.

Figure 3:
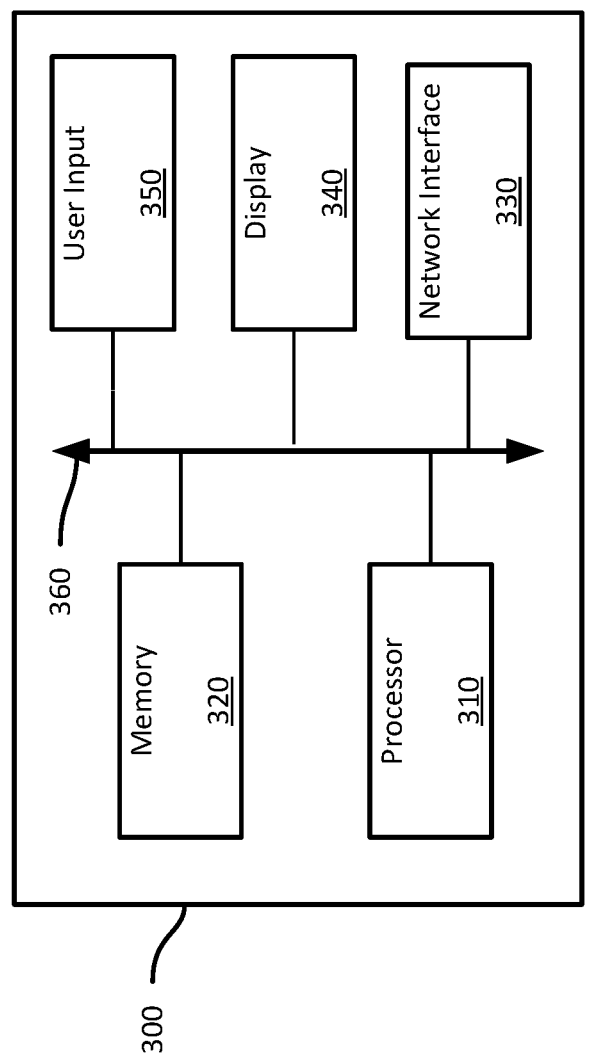
FIG. 3 shows an example computing device for acceleration of online certificate status checking with an Internet hinting service.

Referring now to FIG. 3, FIG. 3 shows an example computing device 300 suitable for acceleration of online certificate status checking with an Internet hinting service. The example computing device 300 may be suitable for use as any of the computing devices of FIGS. 1 and 2. The computing device 300 includes a processor 310, a memory 320, a network interface 330, a display 340, and one or more user input device 350. Each of these components is in communication with the other components via one or more communications buses 360. Examples of suitable processors and memories are discussed later in this specification. It should be appreciated that while this example computing device 300 includes a user input device 350 and a display 340, such components are optional and may not be present in some examples, such as in some examples used as content servers 120a-b, certificate authorities 130a-b, proxies 210-220, or at a hinting service 140. Suitable network interfaces 330 may employ wireless Ethernet, including 802.11 a, g, b, or n standards. In one example, the network interface 330 can communicate using Radio Frequency (RF), Bluetooth, CDMA, TDMA, FDMA, GSM, Wi-Fi, satellite, or other cellular or wireless technology. In other examples, the network interface 330 may communicate through a wired connection and may be in communication with one or more networks, such as Ethernet, token ring, USB, FireWire 1394, fiber optic, etc.

Figure 4:
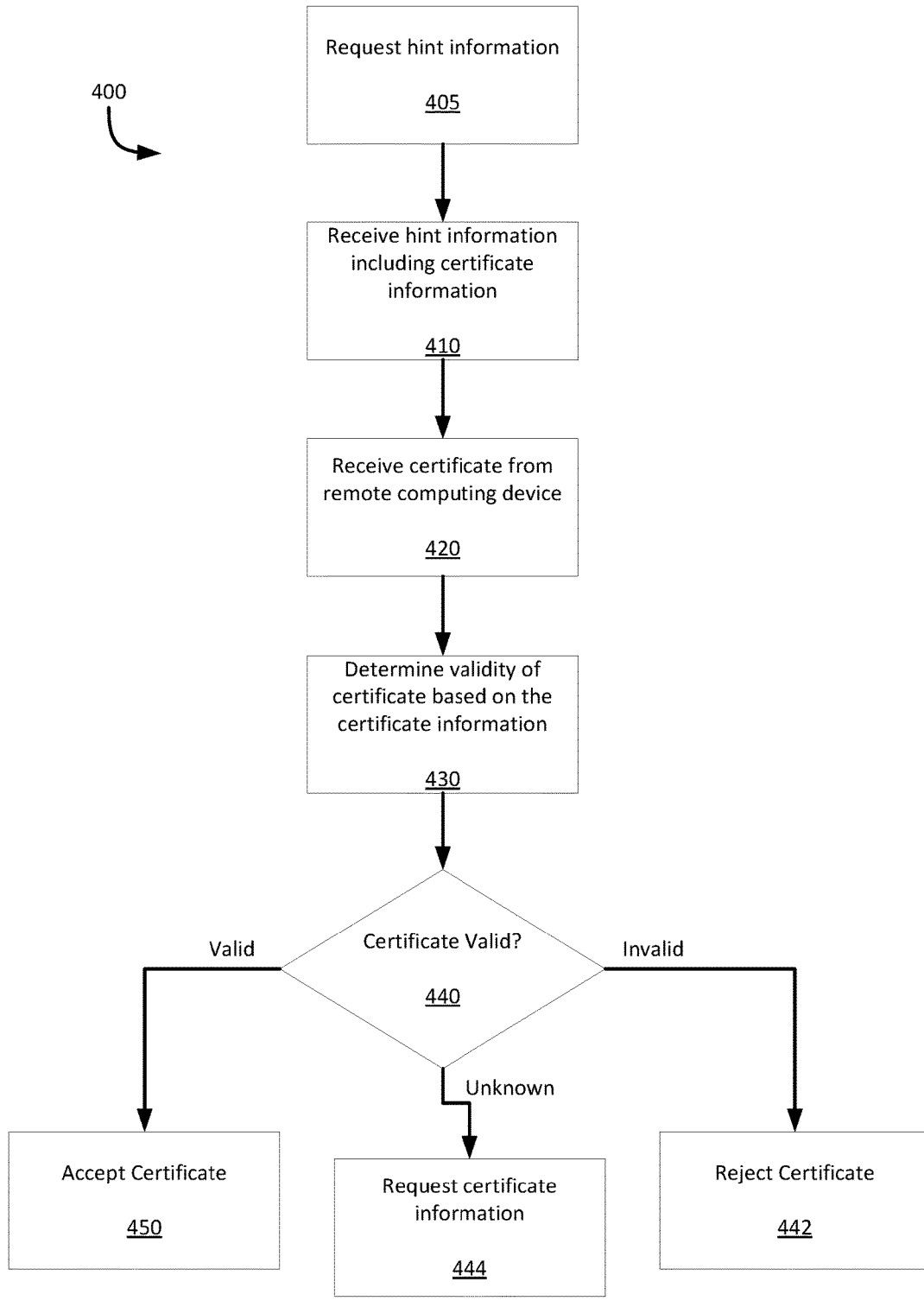
FIGS. 4-9 show example methods for acceleration of online certificate status checking with an Internet hinting service.

Referring now to FIG. 4, FIG. 4 shows an example method 400 for acceleration of online certificate status checking with an Internet hinting service. This example method 400 will be described with respect to the example system 100 shown in FIG. 1. However, this and other example methods according to this disclosure are not limited to use with the system 100 of FIG. 1, but instead are usable with any suitable system according to this disclosure, including the example system 200 of FIG. 2.

At block 405, the client device 110a transmits a request for hint information to the hinting service 140. As discussed above, an application 112a executing on the client device 110a may transmit a request to the hinting service 140 for hint information associated with a content server 120a. Such a request for hint information may be generated and transmitted automatically when the application 112a launches and attempts to connect to the content server 120. In some examples, however, the initiation of a web page transaction with the content server 120a may cause a hint request to be sent to the hinting service 140 by the client device 110a or a computing device other than the client device 110a, e.g., by a web browser, prefetcher, proxy, etc.

For example, a prefetcher 114 may observe or intercept a request for a communications channel with the content server 120a generated or transmitted by the application 112a and identify an intended recipient of the request, such as content server 120a. The prefetcher 114 may then generate and transmit a hint request to the hinting service 140. In some examples, a proxy, such as a client proxy 210 or server proxy 220 may observe or intercept the request for a communications channel with the content server 120a and, in response, generate and transmit a hint request to the hinting service 140.

It should be appreciated that in some examples, a hint request may not be specifically for obtaining certificate information. Rather, hint requests may be used more generally to request information about a web transaction or a computing device, rather than specific requests for certification information. In addition, the hint information may include different types of information, such as information about child objects that may be prefetched, information about one or more certificates usable to establish secure communications, information to generate dynamic URLs, etc.

At block 410, a client device 110a receives, from a hinting server, hint information comprising certificate information. The certificate information in this example includes a CRL from certificate authority 130a, which issued a certificate associated with the content server 120a; however, in some examples, the certificate information may include other information, such as a last-modified date or time or expiration date or time of the certificate information. Still other types of certificate information may be included, such as one or more CRLs associated with other certificate authorities or an OCSP or OCSP stapled response. For example, when communicating with a content server operated by an entity, the entity may provide multiple different content servers that provide different functionality within the context of a transaction. For example, a bank may provide many different servers that a client device 110a may communicate with during the course of providing online banking services to the client device 110a. In this example and throughout this disclosure, "certificate information" can include any one or more pieces of information identifying, indicating the status of, or otherwise containing information about the certificate. Examples of certificate information include the serial number of the certificate, CRL/URL distribution points, the issuer's public key, certificate expiration time, etc. In some instances, the certificate information can include the certificate itself. In other instances, the certificate information does not include the certificate itself.

Further, in some examples, content may be retrieved from one or more servers operated by other entities. Thus, the certificate information may include a CRL associated with the certificate authority that issued the certificate to the first content server the client device 110a communicates with, e.g., a login server, as well as one or more CRLs from certificate authorities associated with other servers that frequently become involved in such transactions, such as servers that provide bank account information, bill pay information, loan information, promotional information, images, etc., whether operated by the same entity or different entities. Thus, as a user of the client device 110a navigates the online banking system, and different content servers are contacted, the client device 110a may have already received CRL information associated with one or more of these different content servers via the certificate information received with the hint information.

At block 420, the client device 110a receives a certificate from a remote computing device. In this example, a remote computing device refers to a computing device to which the client device 110a is attempting to establish a connection. In some cases, the remote computing device may be physically remote from the client device 110a. However, a remote computing device more generally relates to a computing device that is in communication with the client device 110a over a network connection.

As discussed above, when a client device 110a attempts to establish a communications connection (or channel) with a remote computing device, the client device will typically transmit an initial request to the remote computing device to establish the communications channel. The remote computing device may then respond to the request, which the client device 110a may acknowledge, to establish the communications channel. Such a communications channel may initially be unsecured.

To establish a secure communications channel, e.g., using a secure communications protocol such as a Transport Layer Security ("TLS") protocol to setup an HTTPS connection, the client device 110a may then initiate further negotiations with the content server 120a. Thus, after establishing an unsecured communications channel, the client device 110a may issue a TLS request, e.g., a "ClientHello" message, to the content server 120a. The content server 120a, if it supports TLS, may then respond with information about secure protocols supported by the content server 120a as well as one or more certificates to authenticate the content server's identity to the client device 110a, e.g., by sending a "ServerHello" message.

At block 430, the client device 110a determines the validity of the received certificate based on the certificate information. To determine the validity of the certificate, the client device 110a extracts information from the certificate, such as an identity of the certificate authority that issued the certificate, an expiration date or time of the certificate, one or more signatures affixed to the certificate, one or more "stapled" online certificate status protocol ("OCSP") responses, etc. Still other information may be extracted from the certificate in different examples.

After extracting information from the certificate, the client device 110a may use the extracted information to determine the validity of the certificate. For example, the client device 110a may determine that the certificate has expired, or that a signature affixed to the certificate does not decrypt properly through use of an associated encryption method. Such issues may be determined independently of a CRL or other certificate information received from the hinting service 140. However, if such internal authentication checks complete successfully, the client device 110a then checks the certificate against the certificate information received from the hinting service 140.

The certificate information received from the hinting service 140 may include different types of information in different examples. For example, the certificate information may include a CRL and, in some examples, an expiration date or time for the CRL, or may indicate the age of the CRL or the last time the hinting service 140 updated its cached version of the CRL. In some examples, the certificate information may include all known "good" or known "bad" certificates rather than a CRL. For example, a hinting service may receive feedback information from one or more client devices 110a-c indicating whether a certificate from a content server successfully authenticated. The hinting service 140 may then store and send certificate information indicating the known validity of a certificate and the time at which the certificate was last indicated as valid. In some examples, the certificate information may include a list of all certificates, whether good or bad, and an indication of each certificate's status. In some examples, the certificate information may be formatted according to one or more industry-standard formats, e.g., as a CRL, or according to an industry-standard protocol, e.g., OCSP or OCSP stapling.

In this example, the certificate information received from the hinting service 140 includes a CRL from a certificate authority associated with the certificate issued to the content server 120a and an expiration date of the CRL and the age of the CRL. The client device 110a examines the CRL to determine whether the CRL is valid. If the expiration date or time has passed, or the CRL's age is greater than a predetermined threshold, e.g., 1 hour, the client device 110a may invalidate the CRL and be unable to determine the validity of the certificate without requesting further information from the issuing certificate authority.

If the CRL is valid, the client device 110a then searches the CRL to find an entry that matches the certificate received from the content server 120a. If a matching entry is found, the client device 110a determines that the certificate has been revoked and that it is invalid. However, if no matching entry is found, the client 110a device determines that the certificate remains valid.

Thus, after examining the certificate itself and the certificate information, the client device 110a is able to determine whether the certificate is valid, invalid, or whether further information is needed.

At block 440, the client device 110a selects an appropriate next step depending on the validity of the certificate. If the certificate is valid, the method 400 proceeds to block 450. If the certificate is invalid, the method 400 proceeds to block 442. However, if the client device 110a is unable to determine the validity of the certificate based on the certificate information received from the hinting service 140, the method 400 proceeds to block 444.

At block 442, in this example the client device 110a rejects the certificate and terminates the secure communications channel. In some examples, the client device 110a may also terminate the unsecured communications channel to the content server 120. In some examples, however, the client device 110a may instead notify a user that the certificate is invalid and request user intervention. For example, the client device 110a may ask the user whether to proceed without a valid certificate or to proceed with an unsecure connection.

At block 444, the client device 110a, which was unable to determine the validity of the certificate with the certificate information, transmits a request to the issuing certificate authority, e.g., certificate authority 130a, to validate the certificate. The client device 110a may then use the responsive information from the certificate authority 130a to determine the validity of the certificate. If the certificate is valid, the client device 110a may establish a secure communications channel as described below with respect to block 450; otherwise, the client device 110a may operate as described above with respect to block 442.

At block 450, the client device 110a accepts the certificate and responds to the content server 120a to establish the secure communications channel. In some examples, after determining that the certificate is valid, the client device 110a may provide certificate information to the hinting service 140 to update the hinting service with new or updated certificate information as will be described in more detail below with respect to FIG. 7 below.

While the example method 400 of FIG. 4 is discussed from the perspective of the client device 110a, it should be appreciated that any of the client proxy 210, the server proxy 220, the prefetcher 114, the web browser 112c, or other application 112a-b or computing device may perform such a method 400 according to different examples.

Figure 5:
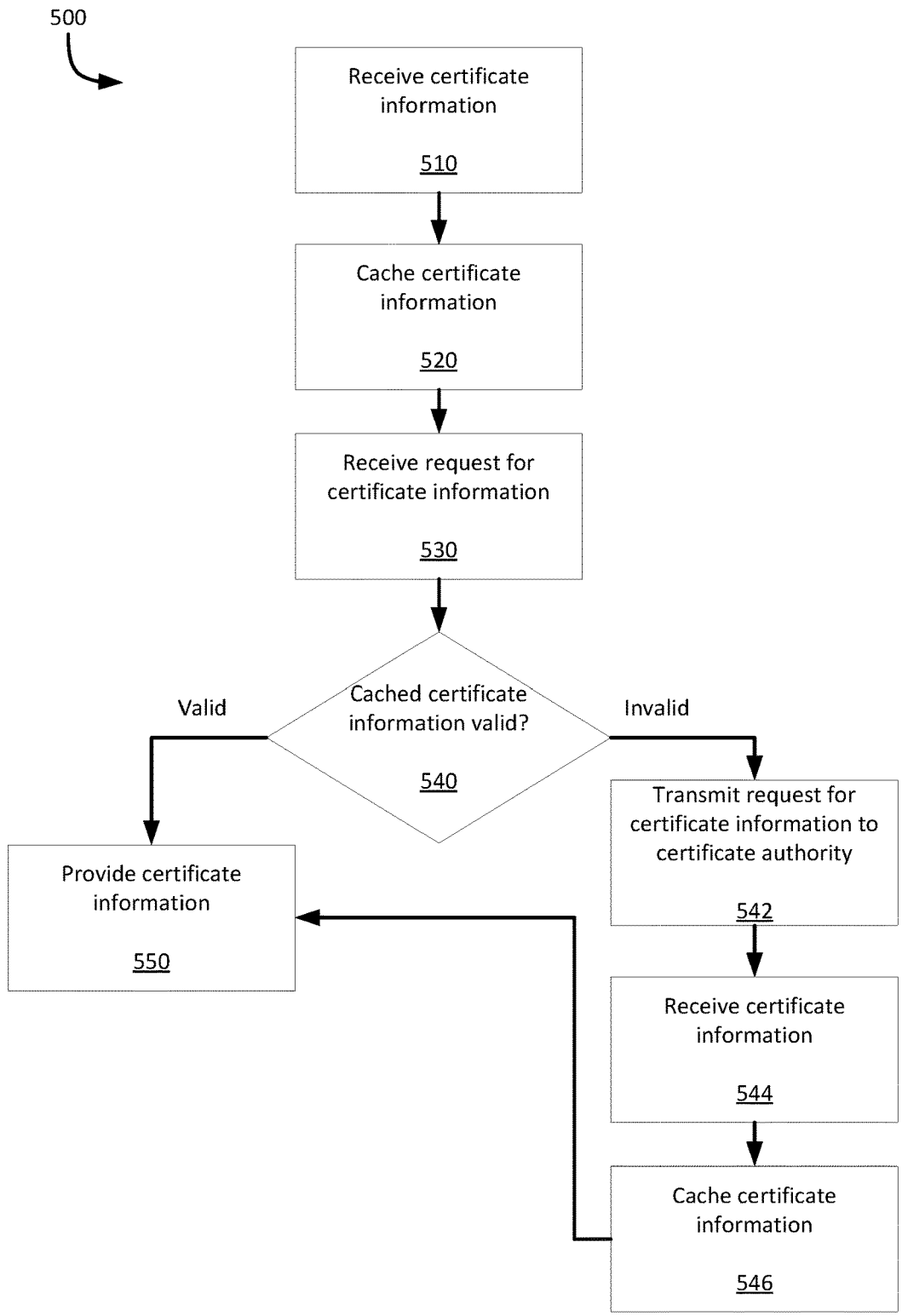

Referring now to FIG. 5, FIG. 5 shows an example method 500 for acceleration of online certificate status checking with an Internet hinting service. This example method 500 will be described with respect to the example system 200 shown in FIG. 2. However, this and other example methods according to this disclosure are not limited to use with the system 200 of FIG. 2, but instead are usable with any suitable system according to this disclosure, including the example system 100 of FIG. 1.

At block 510, the client proxy 210 receives certificate information associated with a certificate for a content server, such as content server 120a. In this example, the certificate information was received from the certificate authority 130a that issued one or more certificates to the content server 120a. The client proxy 210 received the certificate information from the certificate authority 130a in response to a request sent by the client proxy 210 for the certificate information. In this example, the client proxy 210 intercepted a response from the content server 120a to the client device 110a and extracted a certificate from the response. The client proxy 210 then examined the certificate to extract the identity of one or more issuing certificate authorities, in this case just one, and issued a request to the certificate authority 130a for the certificate information.

At block 520, the client proxy 210 caches at least a portion of the certificate information. For example, the client proxy 210 may cache a status of the certificate, e.g., "valid" or "not valid," based on certificate information received from the certificate authority. In some examples, the client proxy 210 may cache an expiration date or time, an age, a CRL, or other information received from the certificate authority associated with the certificate. In some examples, the certificate information may include an OCSP response or an OCSP stapled response.

Further, if the client proxy has received feedback information indicating that multiple certificates were employed in a particular web transaction, including the certificate information received at block 510, the client proxy may cache a relationship between the certificate and other certificates, e.g., an indication that each of the certificates was involved in a single web page transaction. Thus, at a later time, the client proxy is able to provide the certificate information for all of the related certificates for that particular web page transaction. The relationship information may be stored in each cache as explicit references to other related certificates, or a further record may be created identifying all cached certificates associated with a web site, web page, content server, or other entity.

At block 530, the client proxy 210 receives a request for certificate information. In this example, the client proxy 210 intercepts a request transmitted from a client device 110a to a certificate authority 130a regarding a certificate associated with the content server 120a. The client proxy 210 examines the request to identify one or more certificates within the request. If a certificate (or certificates) is identified, the method 500 proceeds to block 540.

At block 540, the client proxy 210 searches its cache to determine whether it has certificate information associated with the one or more certificates identified at block 530. If certificate information is found, the client proxy 210 determines whether the cached certificate information is valid. For example, the client proxy 210 may check a last-updated date or time to determine the age of the certificate information. If the age is greater than a threshold, e.g., 72 hours, the client proxy may invalidate the cached certificate information. However, if the cached information for one or more certificates is valid, the method 500 proceeds to block 550. Otherwise, the method 500 proceeds to block 542.

At block 542, the client proxy 210 transmits one or more requests for certificate information to the certificate authority(ies) 130a-b that issued the certificate(s) identified at block 530 for which valid cached certificate information was not found. As discussed above, each certificate includes information identifying the issuing certificate authority 130a-b. Thus, the client proxy 210 is able to extract from each certificate the issuing certificate authority 130a-b and transmit a request to the corresponding certificate authorit(ies) 130a-b.

At block 544, the client proxy 210 receives certificate information from one or more certificate authorities 130a-b. For example, the client proxy 210 may receive a CRL or a status of the certificate(s) from the certificate authority(ies) 130a-b. In some examples, the certificate information may indicate an expiration date or time of the certificate(s). In some examples, the certificate information may indicate a temporary revocation or "hold" status for a certificate, which may indicate that the certificate is currently invalid but may be valid at a later time. In some examples, certificate information may comprise an OCSP response or an OCSP stapled response.

At block 546, the client proxy 210 caches at least a portion of the received certificate information as discussed above with respect to block 520 above.

At block 550, the client proxy 210 provides the certificate information to the computing device that requested the certificate information, such as client device 110a. Further, in this example, because the client proxy 210 has fulfilled the client device's request for certificate information, the client proxy 210 may discard the client device's request.

While the example method 500 of FIG. 5 is discussed from the perspective of the client proxy 210, it should be appreciated that any of the client proxy 210, the server proxy 220, the prefetcher 114, the web browser 112c, or other application 112a-b or computing device may perform such a method 500 according to different examples.

Figure 6:
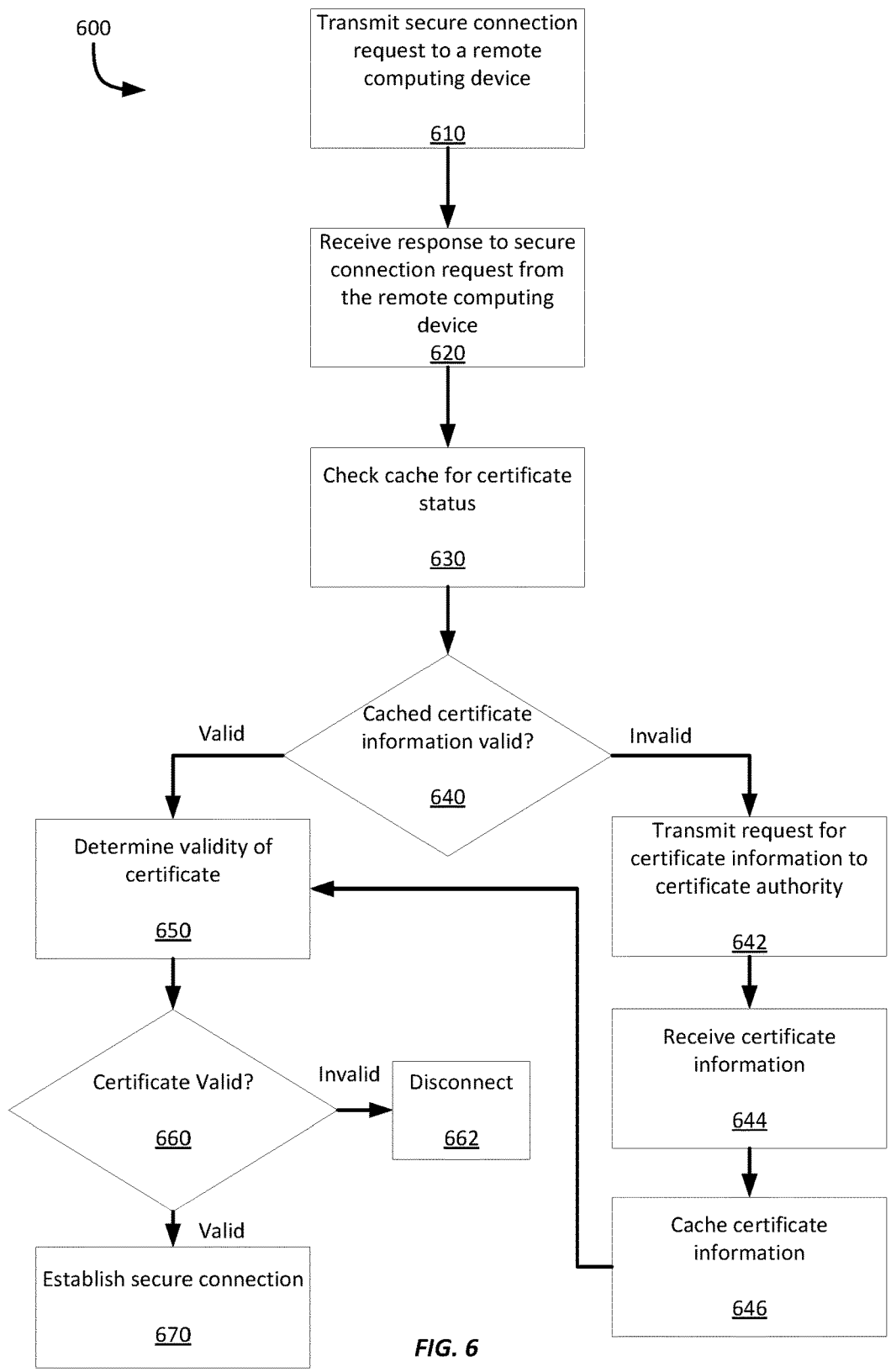

Referring now to FIG. 6, FIG. 6 shows an example method 600 for acceleration of online certificate status checking with an Internet hinting service. This example method 600 will be described with respect to the example system 100 shown in FIG. 1. However, this and other example methods according to this disclosure are not limited to use with the system 100 of FIG. 1, but instead are usable with any suitable system according to this disclosure, including the example system 200 of FIG. 2.

At block 610, the client device 110a transmits a request for a secure connection to a remote computing device, such as content server 120a. In this example, the client device 110a transmits a "ClientHello" message to the content server 120a to negotiate a secure connection using TLS. However, other secure communication protocols may be employed according to different examples.

At block 620, the client device 110a receives a response to the request for a secure connection from the content server 120a. In this example, the client device 110a receives a "ServerHello" message from the content server 120a, which includes a certificate issued by a certificate authority 130a. In some examples, the certificate may be provided according to any suitable certificate standard.

At block 630, the client device 110a checks its cache to determine whether it has fresh status information indicating the validity of the received certificate. For example, the client device 110a may cache status information for certificates it receives from one or more content servers. In this example, the client device 110a previously received hint information that included certificate information, which may generally be performed in a manner similar to that described above with respect to blocks 405 and 410 of FIG. 4. In other examples however, the client device 110a may maintain cached certificate status for commonly-visited content servers, such as for online shopping web sites, banking web sites, or social media web sites.

At block 640, if cached certificate status information is identified, the client device 110a determines whether the cached status information is fresh. For example, the client device 110a may determine whether an expiration date or time has passed, or whether an age of the cached certificate status information exceeds a threshold, e.g., 1 hour. If the cached status information is fresh, the method 600 proceeds to block 650, otherwise, the method 600 proceeds to block 642. Further, if no cached certificate status information is found, the method 600 proceeds to block 642.

At block 642, the client device 110a extracts information from the certificate indicating the issuing certificate authority and transmits a request to the issuing certificate authority requesting the status of the certificate which may generally be performed in a manner similar to that described above with respect to block 542 of FIG. 5.

At block 644, the client device 110a receives certificate information from the issuing certificate authority which may generally be performed in a manner similar to that described above with respect to block 544 of FIG. 5.

At block 646, the client device 110a caches at least some of the certificate information which may generally be performed in a manner similar to that described above with respect to block 546 of FIG. 5.

At block 650, the client device 110a determines the validity of the certificate which may generally be performed in a manner similar to that discussed above with respect to block 430 of FIG. 4.

At block 660, the client device 110a selects an appropriate next step depending on the validity of the certificate. If the certificate is valid, the method 600 proceeds to block 670. If the certificate is invalid, the method 600 proceeds to block 662.

At block 662, the client device 110a terminates the negotiation of the secure communications channel and, in some examples, disconnects from the content server 120a as discussed above with respect to block 442 of FIG. 4.

At block 670, the client device 110a proceeds with negotiating the secure communications channel, including generating and sharing encryption keys in some examples.

Figure 7:
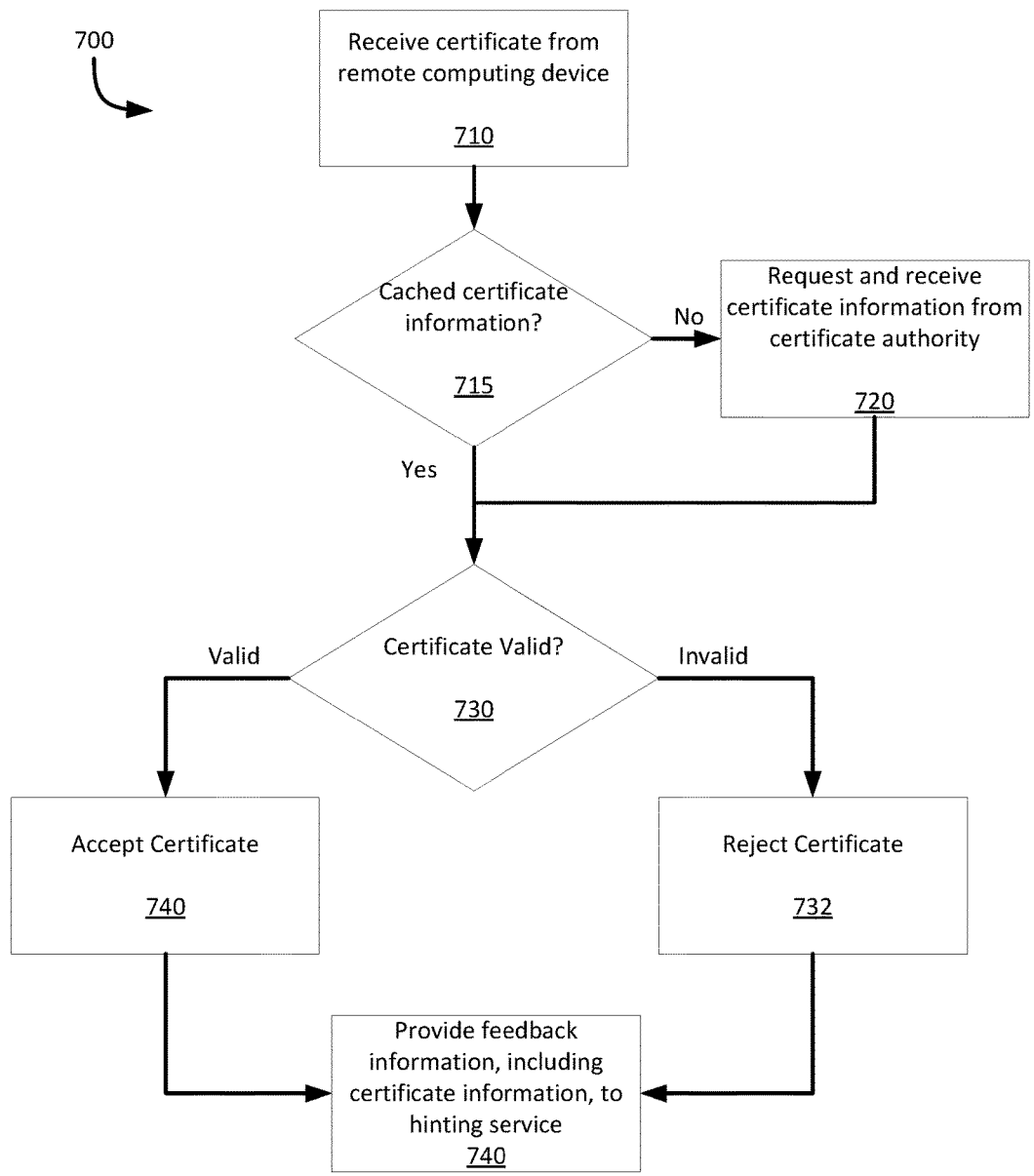

Referring now to FIG. 7, FIG. 7 shows an example method 700 for acceleration of online certificate status checking with an Internet hinting service. This example method 700 will be described with respect to the example system 100 shown in FIG. 1. However, this and other example methods according to this disclosure are not limited to use with the system 100 of FIG. 1, but instead are usable with any suitable system according to this disclosure, including the example system 200 of FIG. 2.

At block 710, a client device receives a certificate from a remote computing device. In this example, client device 110a requested a secure communications channel with content server 120a. In response, the client device 110a received the content server's certificate as discussed above with respect to 544 of FIG. 5. In response to receiving the certificate information, the client device 110a first checks its cache for certificate information associated with the certificate (which may generally be performed in a manner similar to that described above with respect to block 630 of FIG. 6) and, finding no fresh cached certificate information, issues a request to the issuing certificate authority for information about the certificate.

At block 715, the client device 110a determines whether it has cached certificate information that can be used to validate the certificate. If so, the method 700 proceeds to block 730; otherwise, it proceeds to block 720.

At block 720, the client device 110a requests and receives certificate information from the certificate authority as discussed above with respect to blocks 542 and 544 of FIG. 5. In some examples, the client device 110a may also cache the received certificate information which may generally be performed in a manner similar to that described above with respect to block 546 of FIG. 5.

At block 730, the client device 110a selects an appropriate next step depending on the validity of the certificate. If the certificate is valid, the method 700 proceeds to block 740. If the certificate is invalid, the method 700 proceeds to block 732.

At block 732, the client device 110a rejects the certificate and terminates the negotiation of the secure communications channel and, in some examples, disconnects from the content server 120a.

At block 740, the client device 110a accepts the certificate and continues negotiating the secure communications channel.

At block 750, the client device 110a generates and transmits feedback information to the hinting service 140. In this example, during the negotiation with the content server 120a, the client device gathered information regarding the negotiation, including the certificate presented by the content server 120a, the certificate information used to authenticate the certificate, such as hint information or information received from the issuing certificate authority, and whether the client device 110a accepted or rejected the certificate. The client device 110a then transmits the feedback information to the hinting service 140, which may employ the feedback information to provide hint information to subsequent hint requests from the client device 110a or other client devices, such as described below with respect to FIG. 8 below.

In many of the examples discussed above with respect to FIGS. 1-7, the hinting service 140 provides hinting information including certificate information in response to a request for the hinting information, e.g., from a client device 110a-110c, a client proxy 210, or a server proxy 220. The hinting information can be said to be "pulled" from the hinting service 140. Alternatively or in addition, the hinting service 140 can "push" hinting information. For example, the hinting service 140 can push hinting information to a client device 110a in response to an action taken at the client device 110a, upon the client device 110a entering a particular state, etc. For example, in response to being notified (e.g., by the client device 110a, a client proxy 210, or a server proxy 220) that the client device 110a has received search results comprising web site A, web site B, and web site C, the hinting service 140 can be configured to push hints for web site A, web site B, and/or web site C, including certificate information, to client device 110a. In the foregoing example, the hinting service 140 might be configured to provide hints for less than all of the web sites in the search results. For example, the hinting service 140 might be configured to push hints only for the web sites that the hinting service 140 knows the client device 110a has visited before or has visited more than a threshold number of times during a recent time period. Another example that might trigger the hinting service 140 to push hints to the client device 110a is when the client device 110a is activated. For example, the hinting service 140 may have learned over time that the client device 110a often requests a particular web page or a particular set of pages shortly after the client device's 110a browser is opened. In this example, the hinting service 140 can thus be configured to push hints for that particular web page or set of pages to the client device 110a in response to being notified (e.g., by the client device 110a, a client proxy 210, or a server proxy 220) that the client device's 110a browser was opened.

Figure 8:
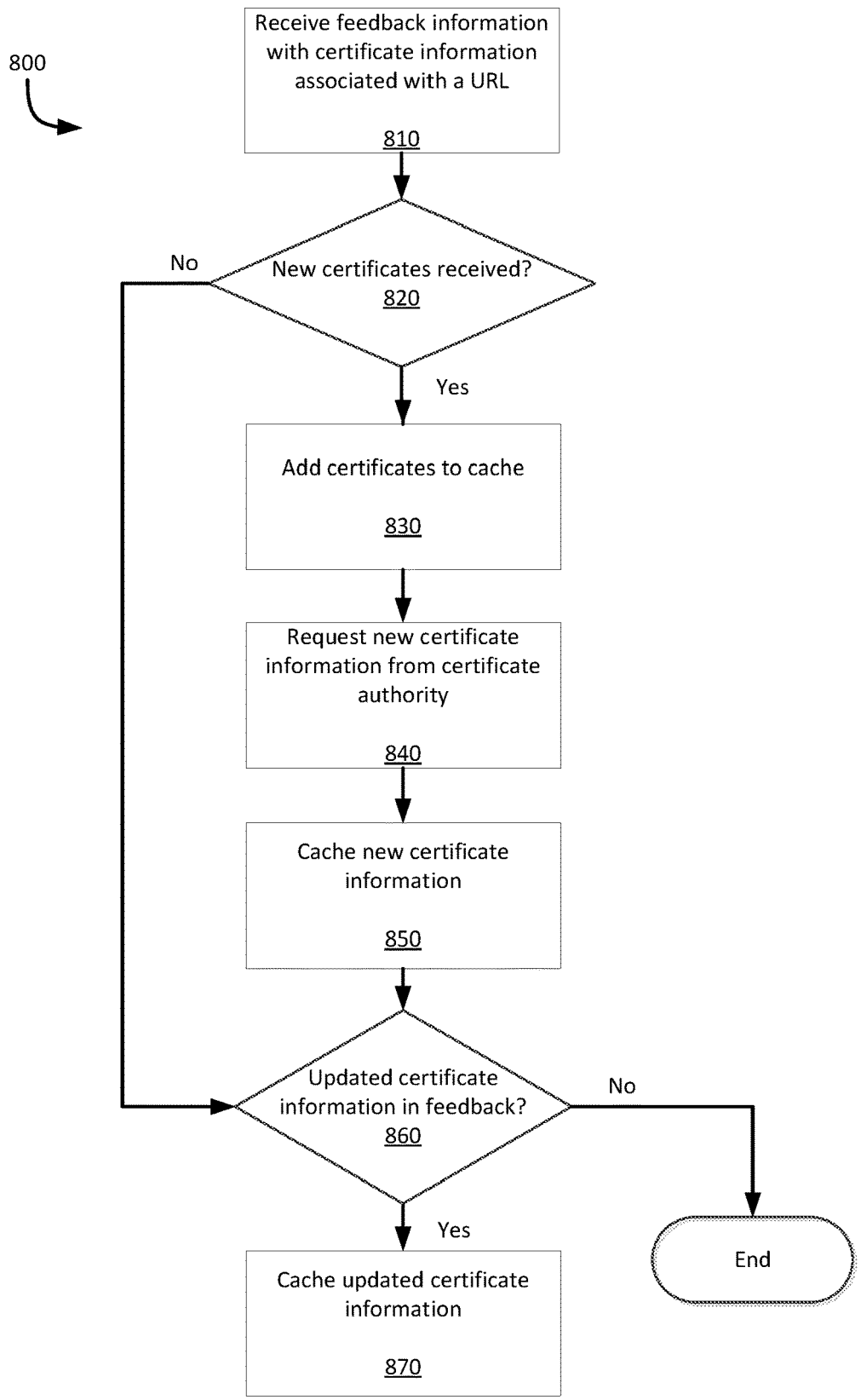

Referring now to FIG. 8, FIG. 8 shows an example method 800 for acceleration of online certificate status checking with an Internet hinting service. This example method 800 will be described with respect to the example system 100 shown in FIG. 1. However, this and other example methods according to this disclosure are not limited to use with the system 100 of FIG. 1, but instead are usable with any suitable system according to this disclosure, including the example system 200 of FIG. 2.

At block 810, the hinting service 140 receives feedback information that includes certificate information from a remote computing device, such as client device 110a. In this example, client device 110a has engaged in a web page transaction with content server 120a, which included establishing a secure communications channel. During the web page transaction, the client device 110a gathered feedback information relating to the web page transaction, such as identifying web objects requested during the transaction as well as a certificate provided by the content server 120a, such as described above with respect to the method 700 of FIG. 7. The client device 110a then transmitted the feedback information to the hinting service 140, which received the feedback information, including the information about the certificate received by the client device 110a during the web page transaction.

At block 820, the hinting service 140 determines whether the certificate information received from the client device 110a relates to one or more certificates that are unknown to the hinting service 140. For example the hinting service 140 may maintain one or more caches of certificate information and therefore may search the cache(s) for corresponding certificate information. If the certificate information relates to a certificate previously unknown to the hinting service 140, e.g., a certificate not found in the cache(s), the method proceeds to block 830. A certificate previously unknown to the hinting service 140 is sometimes referred to herein as a "new certificate." Otherwise, the method 800 proceeds to block 860.

At block 830, the hinting service 140 requests and then receives certificate information from the issuing certificate authority regarding the new certificate. The certificate information can include validity information for the certificate, and may generally be performed in a manner similar to that discussed above with respect to block 542 of FIG. 5.

At block 840, the hinting service 140 utilizes the certificate information obtained from the issuing authority to determine whether the new certificate has been revoked.

At block 850, the hinting service 140 creates a new cache entry for the new certificate and associates the certificate information, including revocation status.

At block 860, the hinting service 140 identifies certificate information in the feedback information that relates to a certificate already known to the hinting service 140, e.g., a certificate already present in the hinting service's cache(s). If certificate information associated with known certificate is found in the feedback information, the method 800 proceeds to block 870. Otherwise, the method 800 is completed until additional feedback information is received.

At block 870, the hinting service 140 determines whether the certificate information cached by the hinting service 140 differs from the certificate information received from the issuing certificate authority. If the certificate information does not differ, the hinting service 140 may not modify the cached certificate information, or it may update a "last-updated" date or time to be the then-current date or time. However, if the certificate information received from the issuing certificate authority differs from the cached certificate information, the hinting service 140 updates the cached certificate information and associated information, e.g., a last-updated date or time. Alternatively, the hinting service 140 can request, at block 870, from the certificate issuing authority (e.g., 130*a*) new certificate information for the cached certificate. The hinting service 140 can then update the cached certificate information with the certificate information received from the certificate issuing authority.

It should be appreciated that in some examples, blocks 840 and 850 may be optional or omitted entirely. For example, a hinting service 140 may receive and cache new certificates as described above with respect to blocks 810-830, but rather than proceed to block 840, the hinting service 140 may instead cache any certificate status information received in the feedback information associated with the new certificates and not separately request information from one or more certificate authorities. Thus, some example methods according to this disclosure may proceed directly from block 830 to block 860.

Figure 9:
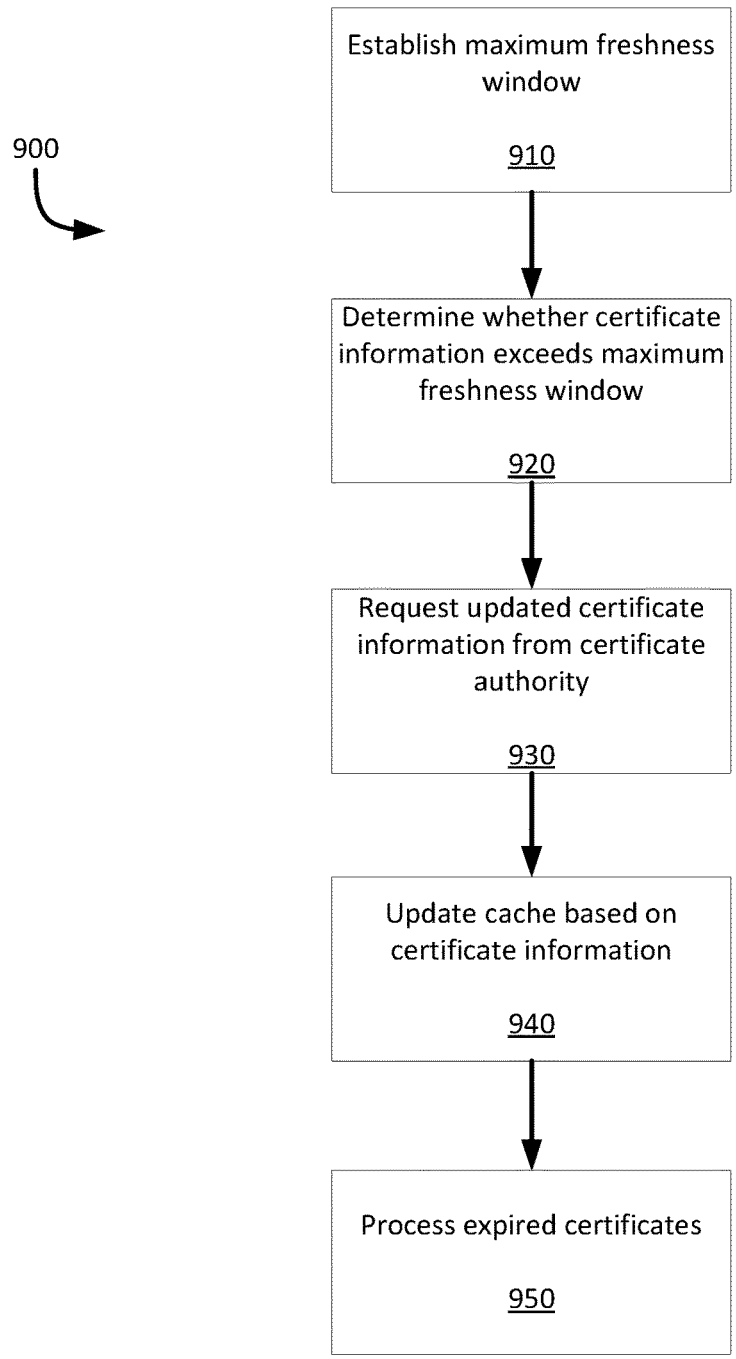

Referring now to FIG. 9, FIG. 9 shows an example method 900 for acceleration of online certificate status checking with an Internet hinting service. This example method 900 will be described with respect to the example system 100 shown in FIG. 1. However, this and other example methods according to this disclosure not limited to use with the system 100 of FIG. 1, but instead are usable with any suitable system according to this disclosure, including the example system 200 of FIG. 2.

At block 910, the hinting service 140 establishes a freshness window for one or more entries in its cache of certificate information. For example, as discussed above with respect to FIG. 8, the hinting service 140 may create a new entry in a cache for a newly-identified certificate. The hinting service 140 may store other information associated with the certificate, such as information received from an issuing certificate authority. In this example, the hinting service 140 also establishes a freshness window for the entry. The freshness window in this example does not necessarily indicate a time at which the certificate expires, but rather, indicates a time at which the hinting service 140 must refresh the cached certificate information, if it has not already been updated.

For example, for each cached certificate information cache entry, the hinting service 140 may maintain an individual freshness window associated with the entry. In this example, the freshness window is 1 hour or the expiration date or time of the respective certificate, whichever is sooner. However, in some examples, the freshness window may be established based on an expiration time of the certificate or associated certificate information. For example, the hinting service 140 may determine an expected amount of time that a client device, or the hinting service 140, would need to authenticate a certificate, e.g., three seconds, and establish a freshness window that expires three minutes before the expiration of the certificate information. A freshness window may indicate to the hinting service 140 that updated certificate information should be requested if it has not received feedback information about the certificate from a client device during the freshness window. If the hinting service 140 does receive feedback information from a client for the certificate, the hinting service 140 may update the cached certificate information as discussed above with respect to FIG. 8. In addition, in some examples, the hinting service 140 may also reset the freshness window.

Thus, the hinting service 140 may periodically check the freshness of one or more cached certificates. If one or more cached certificate entries has not been updated within the freshness window, the method 900 proceeds to block 930.

At block 930, the hinting service 140 requests updated certificate information from the issuing certificate authority as discussed above with respect to block 542 of FIG. 5 for any entry or entries that are beyond the freshness window.

At block 940, the hinting service 140 receives and caches the updated certificate information as discussed above with respect to block 840 of FIG. 8. However, while at block 940 the hinting service 140 may not update cached information if nothing has changed, in this example, the hinting service 140 updates the freshness window. For example, the hinting service 140 may reset the freshness window, such as to the sooner of 1 hour or the expiration date or time of the respective certificate.

At block 950, the hinting service 140 may optionally process expired certificates. For example, a cache entry may be associated with a certificate that has already expired based on an expiration date within the certificate. In one example, the hinting service 140 may delete the entry from the cache. However, in some examples, the hinting service 140 may contact the web site or remote computing device to obtain a new certificate. For example, the expired certificate may contain information identifying the web site or computing device that provided the certificate. The hinting service 140 may extract such information and attempt to establish secure communications with the web site or computing device to obtain a new certificate as discussed above with respect to the method 600 of FIG. 6. After receiving the new certificate, the hinting service 140 may update its cache with the new certificate and may request certificate information from the issuing certificate authority and store such information with the new certificate in cache.

The method 900 of FIG. 9 may enable a hinting service 140 to help ensure that it always has fresh certificate information for cached certificates and is therefore able to provide fresh certificate information in response to hint information.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. For example, although many of the examples of transactions for which the hinting service 140 provides hints are web transactions in which the client device 110a-110c requests a web page, the embodiments and examples discussed herein are equally applicable to other transactions examples of which include other applications, such as games and communications.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:

receiving, at a hinting service, hinting feedback from a remote first client computing device, the hinting feedback comprising certificate information about a certificate issued by a certificate authority and indicating that the remote first client computing device used the certificate during a first web transaction as part of establishing a secure communications channel with a content service, wherein the hinting service is on a first server and the certificate authority is on a second server that is distinct and separate from the first server;

determining whether the certificate information comprises new certificate information;

responsive to determining that the certificate information comprises new certificate information, storing the new certificate information in a cache at the hinting service;

receiving, by the hinting service, a request for hint information associated with the certificate from a remote second client computing device; and transmitting, by the hinting service, hint information associated with the certificate from the cache to the second client computing device.

2. The method of claim 1, wherein:

the certificate information comprises status information for the certificate, the determining whether the certificate information comprises new certificate information comprises determining, by the hinting service, whether the status information is fresher than cached status information for the certificate, and the storing the new certificate information in a cache comprises, responsive to determining that the status information is fresher than cached status information for the certificate, replacing, by the hinting service, the cached status information with the status information in the new certificate information.

3. The method of claim 1, further comprising:

transmitting, by the hinting service, a request to a certificate authority for current certificate information associated with the new certificate information;

receiving, by the hinting service, the current certificate information from the certificate authority; and responsive to determining the current certificate information is fresher than the new certificate information, replacing, by the hinting service, the new certificate information with the current certificate information in the cache.

4. The method of claim 1, wherein the first remote client computing device and the second remote client computing device are different computing devices.

5. The method of claim 1, further comprising:

establishing, by the hinting service, a freshness window for an entry in the cache of status information for the certificate;

responsive to determining the freshness window has expired, transmitting, by the hinting service, a request for updated status information for the certificate to the certificate authority associated with the certificate;

receiving, by the hinting service, the updated status information for the certificate and updating the entry in the cache for the certificate based on the updated status information; and establishing, by the hinting service, a new freshness window for the entry of the status information for the certificate.

6. The method of claim 1, further comprising:

identifying, by the hinting service, an entry in the cache having certificate information comprising an expired certificate; and obtaining, by the hinting service, a new certificate from a certificate authority associated with the expired certificate.

7. The method of claim 1, further comprising:
receiving, by the hinting service, from a remote second client computing device a request for hint information for a second web transaction that corresponds to the first web transaction;
retrieving, by the hinting service, the certificate information associated with the first web transaction from the cache; and
transmitting, by the hinting service, the certificate information to the second client computing device.

8. The method of claim 7, wherein:
the first web transaction and the second web transaction comprise obtaining a plurality of objects identified by a same set of uniform resource locators ("URLs") from one or more secure servers, and
the certificate information comprises certificate information for establishing secure connections with the one or more secure servers.

9. The method of claim 1, wherein the storing the new certificate information in the cache comprises:
responsive to determining further that there is not an entry in the cache for the certificate, creating an entry for the certificate in the cache, and
obtaining, by the hinting service, from the certificate authority information indicating whether the certificate has been revoked, and
storing, by the hinting service, the certificate information in the entry in the cache.

10. The method of claim 1, wherein the receiving hinting feedback comprises receiving the hinting feedback over a communications network connecting the hinting service and the first client computing device.

11. The method of claim 1, wherein:
the storing the new certificate information further comprises storing the new certificate information in the cache in association with an identification of a web page loaded by the first client computing device as part of the first web transaction, and
the hinting feedback further comprises an identification of a child resource fetched by the first client computing device as part of the loading of the web page.

12. The method of claim 11, wherein the feedback information further identifies the content service as a source of the web page or the child resource.

13. The method of claim 11 further comprising:
receiving, by the hinting service from a remote second client computing device, a request for hinting information for a second web transaction to be executed by the second client computing device, wherein the second web transaction comprises loading the web page, and
in response to the request, transmitting, by the hinting service to the second client computing device, the hinting information.

14. The method of claim 1, wherein:
the determining whether the certificate information comprises new certificate information further comprises determining whether there is an entry in the cache for the certificate, and
the storing the new certificate information in a cache comprises, responsive to determining that there is not an entry in the cache for the certificate, creating an entry in the cache for the certificate.

15. The method of claim 14 further comprising:
obtaining, by the hinting service from the certificate authority, current status information for the certificate; and storing in the entry in the cache the current status information.

16. The method of claim 15 further comprising:
obtaining, by the hinting service from the certificate authority, updated status information for the certificate, and
updating with the updated status information the current status information stored in the entry in the cache.

17. The method of claim 14, wherein:
the new certificate information comprises status information for the certificate, and
the storing the new certificate information in the cache further comprises, storing in the entry in the cache the status information.

18. A hinting service device comprising:
a non-transitory memory; and
a processor configured to execute processor-executable program code stored in memory, the processor-executable program code configured to cause the processor to:
receive hinting feedback from a remote first client computing device, the hinting feedback comprising certificate information about a certificate issued by a certificate authority and indicating that the remote first client computing device used the certificate during a first web transaction as part of establishing a secure communications channel with a content service, wherein the hinting service is on a first server and the certificate authority is on a second server that is distinct and separate from the first server;
determine whether the certificate information comprises new certificate information;
responsive to a determination that the certificate information comprises new certificate information, store the new certificate information in a cache at the hinting service;
receive a request for hint information associated with the certificate from a remote second client computing device; and
transmit hint information associated with the certificate from the cache to the second client computing device.

19. The device of claim 18, wherein:
the certificate information comprises status information for the certificate, and
the processor-executable program code is further configured to:
determine whether the certificate information comprises new certificate information by determining whether the status information is fresher than cached status information for the certificate, and
responsive to a determination the status information is fresher than the cached status information, replace the cached status information with the status information in the new certificate information.

20. The device of claim 18, wherein the processor-executable program code is further configured to cause the processor to:
transmit a request to a certificate authority for current certificate information associated with the new certificate information;
receive the current certificate information from the certificate authority; and
responsive to a determination the current certificate information is fresher than the new certificate information, replace the new certificate information with the current certificate information in the cache.

21. The device of claim 18, wherein the first remote client computing device and the second remote client computing device are different computing devices.

22. The device of claim 18, wherein the processor-executable program code is further configured to cause the processor to:
   establish a freshness window for an entry in the cache of status information for the certificate;
   responsive to a determination the freshness window has expired, transmit a request for updated status information for the certificate to the certificate authority associated with the certificate;
   receive the updated status information for the certificate and update the entry in the cache for the certificate based on the updated status information; and
   establish a new freshness window for the entry of the status information for the certificate.

23. The device of claim 18, wherein:
   the hinting service is remotely located from the first computing device, and
   the processor-executable program code is further configured to cause the processor to receive the hinting feedback by receiving the hinting feedback over a communications network.

24. The device of claim 18, wherein:
   the processor-executable program code is further configured to cause the processor to store the new certificate information by storing the new certificate information in the cache in association with an identification of a web page loaded by the first client computing device as part of the first web transaction, and
   the hinting feedback further comprises an identification of a child resource fetched by the first client computing device as part of the loading of the web page.

25. The device of claim 18, wherein the processor-executable program code is further configured to cause the processor to:
   receive, from a second client computing device, a request for hinting information for a second web transaction to be executed by the second client computing device, wherein the second web transaction comprises loading the web page, and
   in response to the request, transmit, to the second client computing device, the hinting information.

26. The device of claim 18, wherein the processor-executable program code is further configured to cause the processor to:
   determine whether the certificate information comprises new certificate information by determining whether there is an entry in the cache for the certificate, and
   store the new certificate information in the cache by, responsive to determining that there is not an entry in the cache for the certificate, creating an entry in the cache for the certificate.

27. The device of claim 26, wherein the processor-executable program code is further configured to cause the processor to:
   obtain, from the certificate authority, current status information for the certificate; and
   store in the entry in the cache the current status information.

28. The device of claim 27, wherein the processor-executable program code is further configured to cause the processor to:
   obtain, from the certificate authority, updated status information for the certificate, and
   update the current status information stored in the entry in the cache the updated status information.

* * * * *